(12) United States Patent
Urano et al.

(10) Patent No.: US 8,454,221 B2
(45) Date of Patent: Jun. 4, 2013

(54) LIGHTING UNIT, LIQUID CRYSTAL DISPLAY, AND ELECTRONIC APPARATUS

(75) Inventors: Nobutaka Urano, Chino (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/548,755

(22) Filed: Jul. 13, 2012

(65) Prior Publication Data

US 2013/0027635 A1 Jan. 31, 2013

(30) Foreign Application Priority Data

Jul. 25, 2011 (JP) ................................ 2011-161710

(51) Int. Cl.
*F21V 7/04* (2006.01)
(52) U.S. Cl.
USPC ........... 362/615; 362/561; 362/600; 362/616; 362/619; 362/628
(58) Field of Classification Search
USPC ................ 362/561, 600, 615, 616, 617, 619, 362/628
See application file for complete search history.

(56) References Cited

U.S. PATENT DOCUMENTS

| | | | |
|---|---|---|---|
| 7,750,990 B2 * | 7/2010 | Jeong | 349/58 |
| 2007/0127261 A1 * | 6/2007 | An et al. | 362/608 |
| 2007/0159845 A1 * | 7/2007 | Hirota et al. | 362/600 |
| 2007/0223253 A1 | 9/2007 | Sakai et al. | |
| 2009/0268122 A1 * | 10/2009 | Takahashi | 349/58 |

FOREIGN PATENT DOCUMENTS

| | | |
|---|---|---|
| JP | A-2002-8426 | 1/2002 |
| JP | A-2005-285535 | 10/2005 |
| JP | A-2005-315957 | 11/2005 |
| JP | A-2009-69714 | 4/2009 |

* cited by examiner

*Primary Examiner* — Stephen F Husar
*Assistant Examiner* — Meghan Dunwiddie
(74) *Attorney, Agent, or Firm* — Oliff & Berridge, PLC

(57) ABSTRACT

An end of a light guide plate used for a liquid crystal display and a lighting unit, which is positioned on one side in a first direction, is provided with a depressed portion, and another end of the light guide plate, which is positioned on the other side in the first direction, is provided with a projecting portion. Using the depressed portion and the projecting portion, the light guide plate is placed in a predetermined position of a frame body. The depressed portion and the projecting portion are formed at positions opposite each other in the first direction, and the projecting portion is equal to or smaller than the depressed portion in size.

9 Claims, 8 Drawing Sheets

LIGHTING UNIT, LIQUID CRYSTAL DISPLAY, AND ELECTRONIC APPARATUS

BACKGROUND

1. Technical Field

The present invention relates to a lighting unit provided with a light guide plate and a light source, a liquid crystal display provided with the lighting unit, and an electronic apparatus provided with the liquid crystal display.

2. Related Art

A liquid crystal display provided with a transmissive liquid crystal panel includes a lighting unit in which a light source is placed on a side of an end of a light guide plate, the end is serving as a light incident face, and the liquid crystal panel is placed so as to be stacked on a light emitting face of the light guide plate. In this lighting unit, the light guide plate and the light source are held by a frame body. As an example of placing a light guide plate in a predetermined position of a frame body, JP-A-2002-8426 discloses a structure in which projecting portions are formed in opposite positions at the both ends of the light guide plate and the frame body is provided with depressed portions into which the projecting portions are fitted.

In order to reduce the costs relating to the light guide plate, it is preferable to cut a plurality of light guide plates out of a large translucent plate material. At that time, it is preferable that remaining material portions, which remain after cutting the light guide plates out of the large plate material, be small. However, when projecting portions are formed in opposite positions at the both ends of the light guide plate as in the structure described in JP-A-2002-8426, the projecting portions cause wide gaps between the regions to be light guide plates that are cut out of the large plate material. As a result, the remaining material portions that remain after cutting the light guide plates out of the large plate material are large and the plate material is used inefficiently.

SUMMARY

An advantage of some aspects of the invention is that a lighting unit, a liquid crystal display including the lighting unit, and an electronic apparatus including the liquid crystal display are provided while reducing remaining material portions when a plurality of light guide plates that have projecting portions and depressed portions for the positioning are cut out of a material in the form of a large plate.

A lighting unit according to an aspect of the invention includes a light guide plate, a light source that is provided on a side of an end serving as a light incident face, and a frame body that holds the light guide plate and the light source. The light guide plate includes a depressed portion that is depressed from a first side of the light guide plate in a first direction, and includes a projecting portion that projects from a second side of the light guide plate in the first direction, the second side being opposite the first side, and that is formed at a position on the second side so as to be opposite the depressed portion. A length of the projecting portion in a second direction that crosses the first direction, the first and second directions being in-plane directions, is equal to or smaller than a length of the depressed portion in the second direction, and a length of the projecting portion in the first direction is equal to or smaller than a length of the depressed portion in the first direction.

In the light guide plate used for the lighting unit according to an aspect of the invention, an end of the light guide plate in the first direction has a depressed portion, and the other end thereof in the first direction has a projecting portion. Accordingly, the light guide plate may be placed in a predetermined position of the frame body using at least one of the depressed portion and the projecting portion. The depressed portion and the projecting portion are formed in positions opposite each other in the first direction and the projecting portion is equal to or smaller than the depressed portion in size. Therefore, when a plurality of light guide plates are cut out of a large material plate, since a projecting portion of a light guide plate has a smaller size than a depression portion of an adjacent light guide plate, a remaining portion of the large material plate, which will removed after cuttings, is small, that is, material wastage is reduced.

According to an aspect of the invention, it is preferable that the length of the projecting portion of the light guide plate in the first direction and the length of the depressed portion of the light guide plate in the first direction be equal to each other. In this structure, part of an outline of a projecting portion positioned on a side in the first direction, and part of an outline of an adjacent depressed portion positioned on the same side fall along each other. Thus, the projecting portion and the depressed portion may be formed at the same time.

According to an aspect of the invention, it is preferable that the frame body include a first positioning projection that abuts a first inside face of the depressed portion of the light guide plate, which is positioned on one side in the second direction, a second positioning projection that abuts a second inside face of the depressed portion of the light guide plate, which is positioned on another side in the second direction, a third positioning projection that abuts a first outside face of the projecting portion of the light guide plate, which is positioned on the one side in the second direction, and a fourth positioning projection that abuts a second outside face of the projecting portion of the light guide plate, which is positioned on the other side in the second direction. Due to this structure, the position of the light guide plate may be set using both the depressed portion and the projecting portion.

According to an aspect of the invention, it is preferable that the first positioning projection and the third positioning projection be of equal size in the second direction and formed at the same position in the second direction so as to be opposite each other in the first direction, and the second positioning projection and the fourth positioning projection be of equal size in the second direction and formed at the same position in the second direction so as to be opposite each other in the first direction. Due to this structure, the position of the light guide plate may be set using the depressed portion, the projecting portion, and the positioning projections of the same structure.

According to an aspect of the invention, it is preferable that an optical sheet placed so as to be stacked over the light guide plate be further included, and the optical sheet include a sheet-side depressed portion, which is depressed from a first side of the optical sheet in the first direction, and a sheet-side projecting portion, which projects from a second side of the optical sheet in the first direction, the second side being opposite the first side, and that is formed at a position on the second side so as to be opposite the sheet-side depressed portion. It is also preferable that the length of the sheet-side projecting portion in the second direction be equal to or smaller than the length of the sheet-side depressed portion in the second direction, and the length of the sheet-side projecting portion in the first direction be equal to or smaller than the length of the sheet-side depressed portion in the first direction. Similar to the light guide plate, the optical sheet may also be cut out of a large material sheet efficiently due to this structure.

According to an aspect of the invention, it is preferable that the sheet-side depressed portion of the optical sheet overlap the depressed portion of the light guide plate and the sheet-side projecting portion of the optical sheet overlap the projecting portion of the light guide plate when viewed in a third direction that crosses the first direction and the second direction. Due to this structure, the position of the optical sheet may also be set when the optical sheet has a structure similar to the structure of the light guide plate.

According to an aspect of the invention, a structure may be employed in which an end of the light guide plate that is positioned in the second direction is used as the light incident face.

A lighting unit to which the aspect of the invention is applied may be used for a liquid crystal display and the liquid crystal display includes a liquid crystal panel placed so as to be stacked on a light emitting face of the light guide plate.

The liquid crystal display according to an aspect of the invention is used for an electronic apparatus, such as a liquid crystal television.

DESCRIPTION OF EXEMPLARY EMBODIMENTS

Figure 1A:
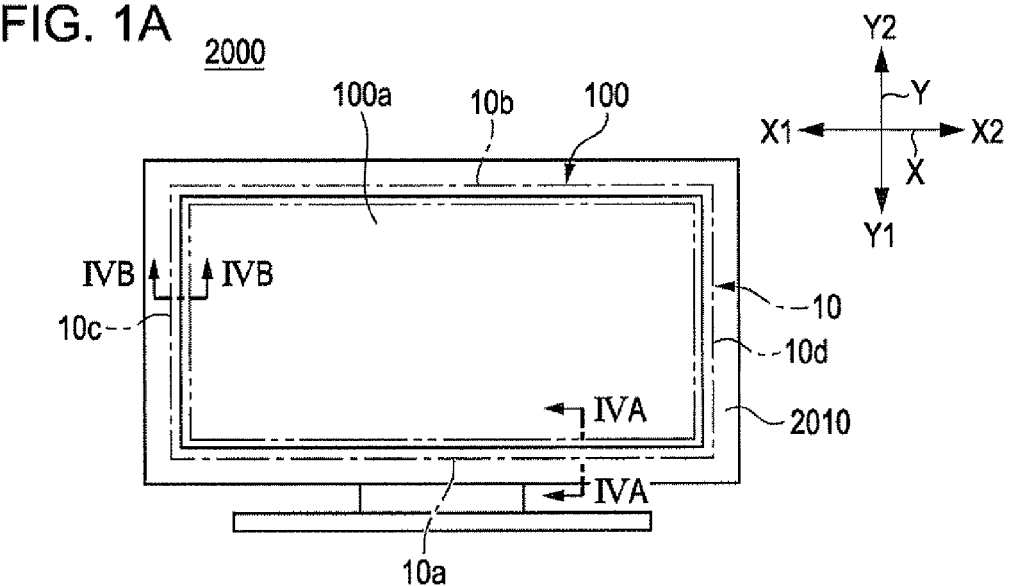
FIGS. 1A and 1B are explanatory views of a liquid crystal television as an example of an electronic apparatus, which is provided with a liquid crystal display according to Embodiment 1 of the invention.

With reference to the drawings, embodiments are described in which the aspect of the invention is applied to a liquid crystal display for a liquid crystal television. The figures mentioned in the description below are illustrated on different scales that vary from one layer or member to another so that such layers and members are large enough to be recognizable in the drawings. In addition, in the description below, one of two directions that cross each other and are in-plane directions of the light guide plate or the liquid crystal panel, i.e., a direction in which the longer sides of the illustrated light guide plate or the illustrated liquid crystal panel serving as a display panel extend is referred to as an X-axis direction, the other direction, i.e., a direction in which the shorter sides of the illustrated light guide plate or the illustrated liquid crystal panel extend is referred to as a Y-axis direction, and the direction that crosses the X-axis direction and the Y-axis direction, i.e., a direction in which the illustrated light guide plate and the illustrated liquid crystal panel are stacked is referred to as a Z-axis direction.

Furthermore, in the figures mentioned below, X1 represents one side in the X-axis direction and X2 represents the other side in the X-axis direction, Y1 represents one side in the Y-axis direction on which a protruding portion of the liquid crystal panel is placed and Y2 represents the other side in the Y-axis direction, which is opposite the side Y1, and Z1 represents one side in the z-axis direction, i.e., the lower side toward which the back face of the light guide plate is directed, and Z2 represents the other side in the Z-axis direction, which is opposite the side Z1, i.e., the upper side toward which illumination light or display light is emitted.

Embodiment 1

The Overall Structure

Figure 1B:
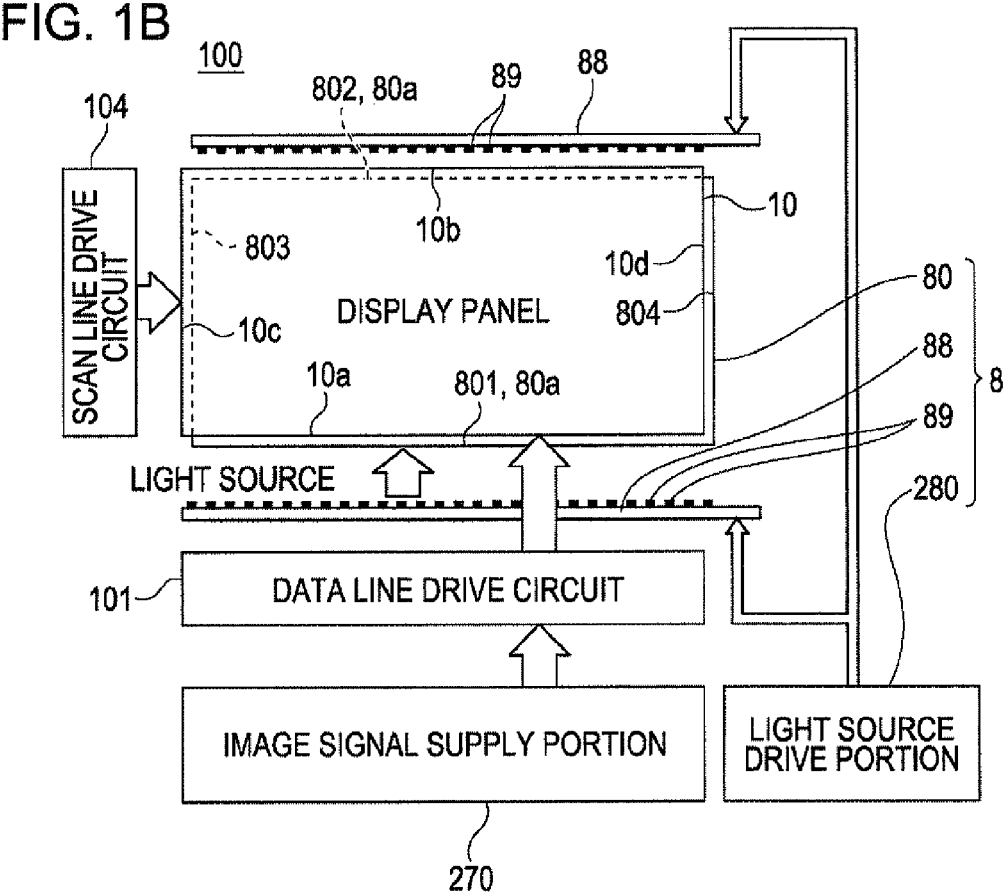

FIGS. 1A and 1B are explanatory views of a liquid crystal television as an example of an electronic apparatus, which is provided with the liquid crystal display according to Embodiment 1 of the invention. Specifically, FIG. 1A is an explanatory view that schematically illustrates the appearance of the liquid crystal television and FIG. 1B is a block diagram that illustrates the electrical structure of the liquid crystal display.

An electronic apparatus 2000 illustrated in FIG. 1A is a liquid crystal television and includes a liquid crystal display 100 and a frame 2010 for a television. The liquid crystal display 100 includes a liquid crystal panel 10 as a display panel, an image signal supply portion 270 that supplies an image signal to the liquid crystal panel 10, and a lighting unit 8 that supplies illumination light to the liquid crystal panel 10, which are described below. The liquid crystal display 100 further includes a scan line drive circuit 104 that drives scan lines extending in the x-axis direction of the liquid crystal panel 10 and a data line drive circuit 101 that drives data lines extending in the Y-axis direction of the liquid crystal panel 10. Both of the scan line drive circuit 104 and the data line drive circuit 101 may be included in the liquid crystal panel 10. As another example, one of the scan line drive circuit 104 and the data line drive circuit 101 may be included in the liquid crystal panel 10 and the other may be included in a driver integrated circuit (IC) mounted on the liquid crystal panel 10 by a chip-on-glass (COG) technique. As still another example, one of the scan line drive circuit 104 and the data line drive circuit 101 may be included in the liquid crystal panel 10 and the other may be included in a driver IC mounted on a circuit substrate electrically connected to the liquid crystal panel 10. As yet still another example, both of the scan line drive circuit 104 and the data line drive circuit 101 may be included in a driver IC separate from the liquid crystal panel 10.

In Embodiment 1, the lighting unit 8 includes a light guide plate 80 that is placed so as to be stacked under the liquid crystal panel 10, a plurality of luminous elements 89 that are arranged along an end referred to as a light incident portion 80a, which is one of the side faces of the light guide plate 80, a light source substrate 88 on which the luminous elements 89 are mounted, and a light source drive portion 280 that drives the luminous elements 89. In Embodiment 1, the liquid crystal panel 10 is a rectangle and has four sides 10a, 10b, 10c, and 10d. Among the sides 10a, 10b, 10c, and 10d, the side 10a is a long side positioned on the side Y1 in the Y-axis direction, the side 10b is a long side positioned on the side Y2 in the Y-axis direction, the side 10c is a short side positioned on the side X1 in the X-axis direction, and the side 10d is a short side positioned on the side X2 in the X-axis direction. The light guide plate 80 has four side faces 801, 802, 803, and 804 that correspond to the sides 10a, 10b, 10c, and 10d, respectively. Among the side faces 801, 802, 803, and 804, the side face 801 is positioned along the long side 10a on the side Y1 in the Y-axis direction, the side face 802 is positioned along the long side 10b on the side Y2 in the Y-axis direction, the side face 803 is positioned along the short side 10c on the side X1 in the X-axis direction, and the side face 804 is positioned along the short side 10d on the side X2 in the X-axis direction. In Embodiment 1, among the four side faces 801, 802, 803, and 804 of the light guide plate 80, the two side faces 801 and 802 opposite each other in the short side direction, i.e., the Y-axis direction, are used as the light incident portions 80a. Thus, the luminous elements 89 are arranged along each of the two side faces 801 and 802 or the light incident portions 80a of the light guide plate 80, and the light source substrate 88 extends along each of the two side faces 801 and 802 or the light incident portions 80a of the light guide plate 80.

The Specific Structure of the Liquid Crystal Display 100

Figure 2A:
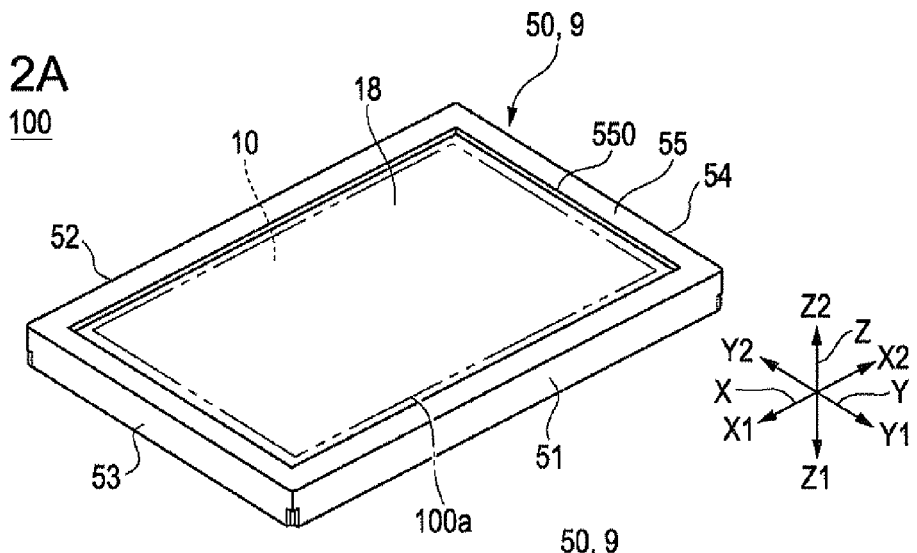
FIGS. 2A and 2B are explanatory views that illustrate the overall structure of the liquid crystal display according to Embodiment 1 of the invention.
Figure 2B:
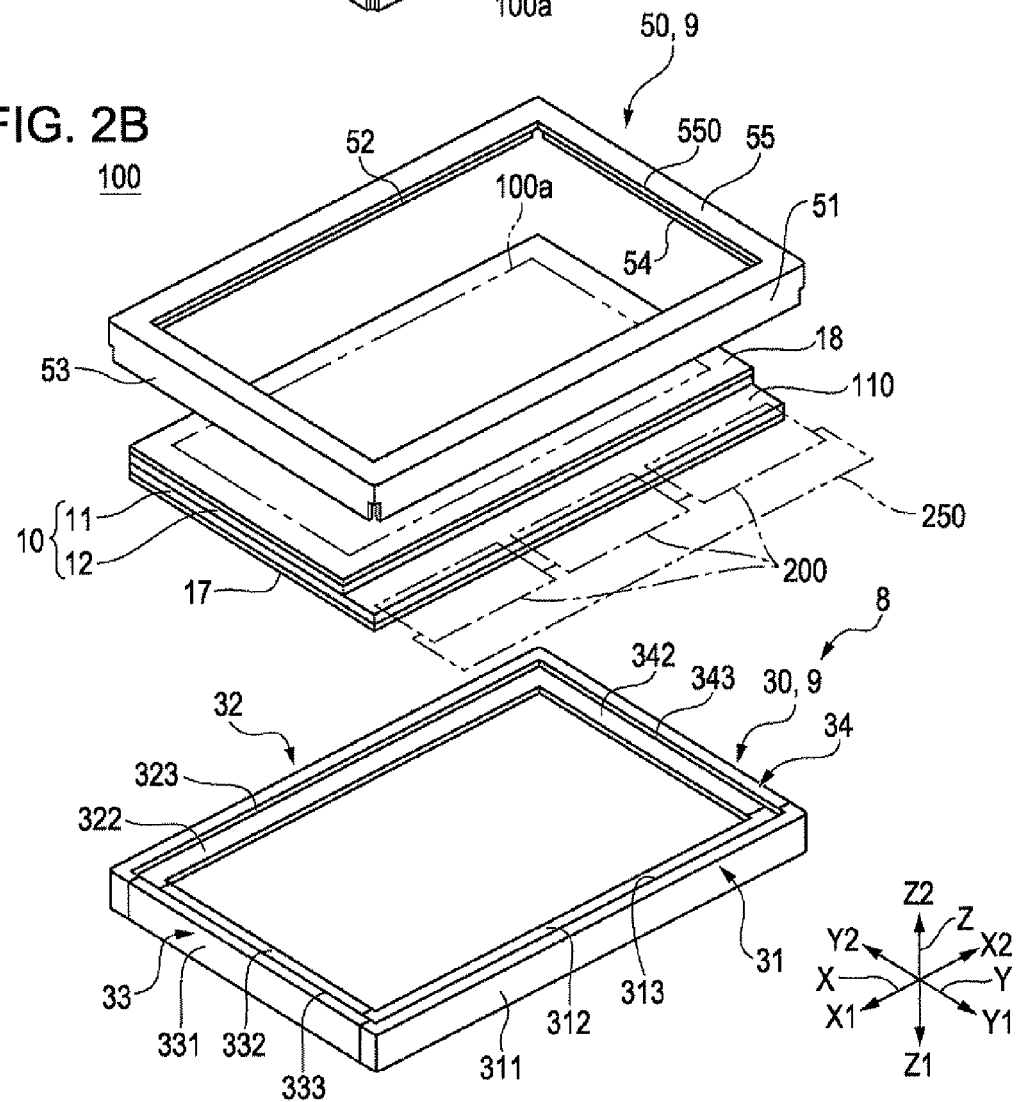
Figure 3:
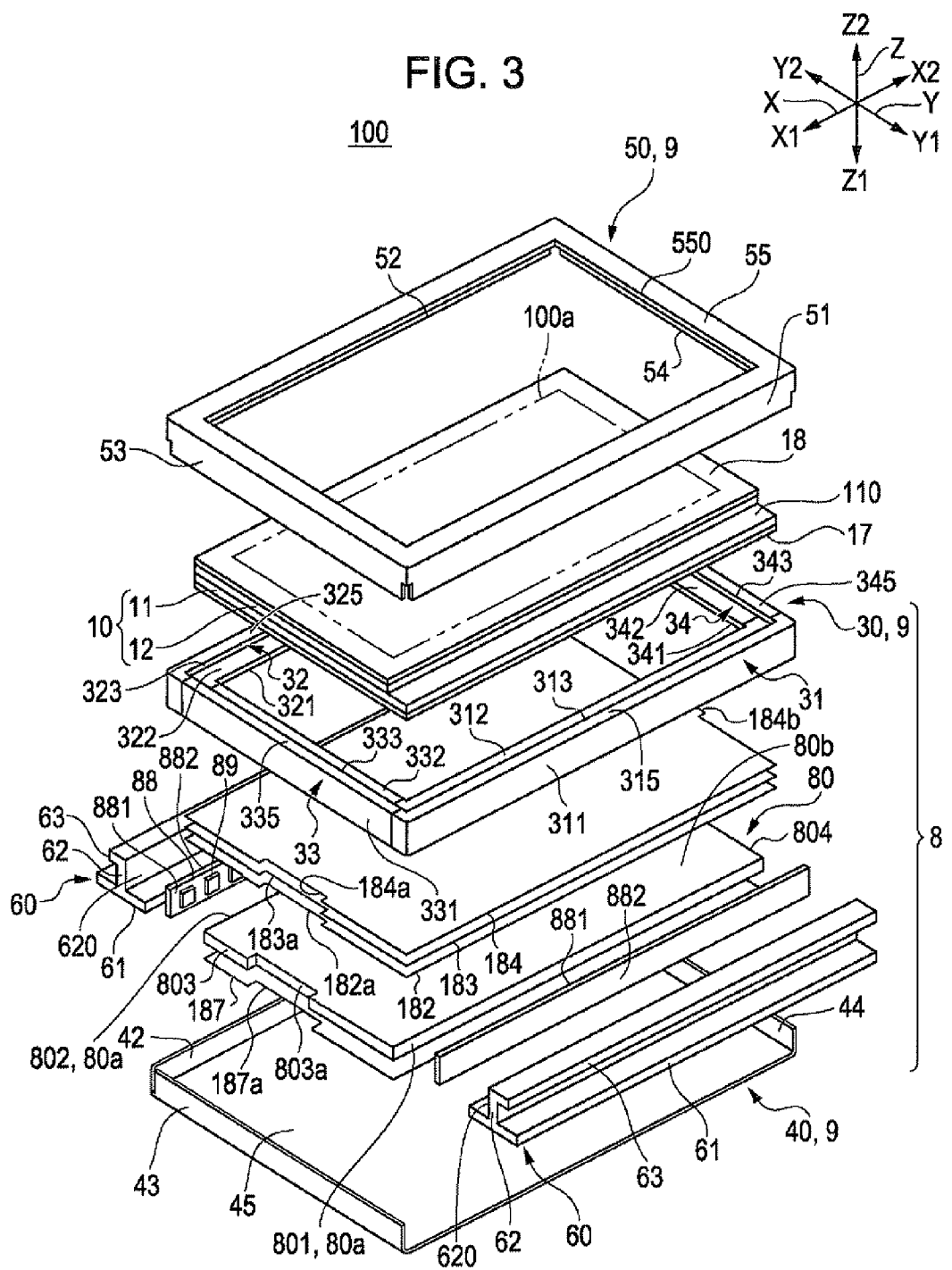
FIG. 3 is an exploded perspective view obtained when the liquid crystal display according to Embodiment 1 of the invention is broken down into its components.
Figure 4A:
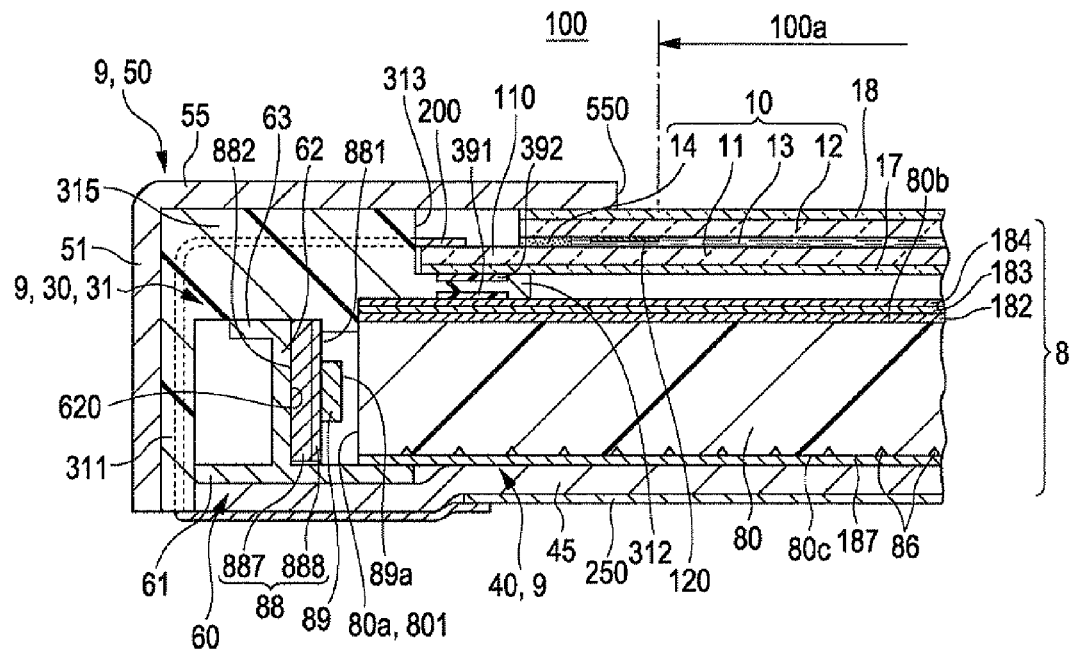
FIGS. 4A and 4B are cross-sectional views of the liquid crystal display according to Embodiment 1 of the invention.
Figure 4B:
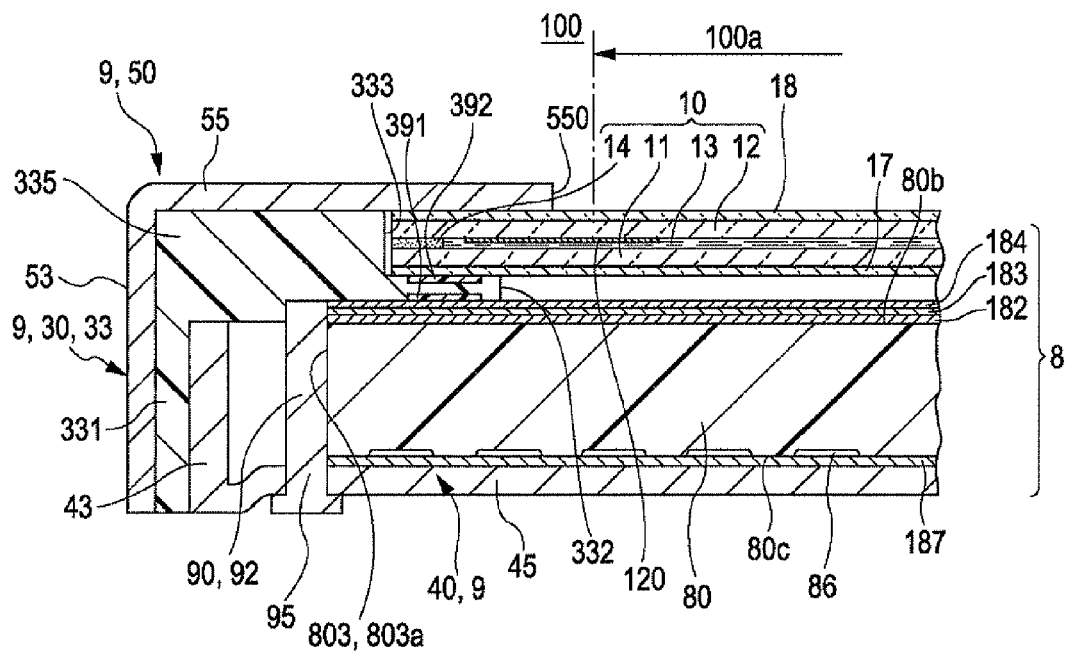

FIGS. 2A and 2B are explanatory views that illustrate the overall structure of the liquid crystal display 100 according to Embodiment 1 of the invention. Specifically, FIG. 2A is a perspective view of the liquid crystal display 100 and FIG. 2B is an exploded perspective view of the liquid crystal display 100. FIG. 3 is an exploded perspective view obtained when the liquid crystal display 100 according to Embodiment 1 of the invention is broken down into its components. FIGS. 4A and 4B are cross-sectional views of the liquid crystal display 100 according to Embodiment 1 of the invention. Specifically, FIG. 4A is a cross-sectional view obtained when the liquid crystal display 100 is cut along line IVA-IVA in FIG. 1A and FIG. 4B is a cross-sectional view obtained when the liquid crystal display 100 is cut along line IVB-IVB in FIG. 1A.

As illustrated in FIGS. 2A, 2B, 3, 4A, and 4B, the liquid crystal display 100 according to Embodiment 1 is generally provided with the lighting unit 8, which is a so-called a backlight unit, and the transmissive liquid crystal panel 10 placed so as to be stacked over the lighting unit 8. In the liquid crystal display 100, the lighting unit 8 is provided with a frame body 9. In Embodiment 1, the frame body 9 includes a first frame 40, which is a lower metal frame made of metal and placed on the lower side, i.e., the side Z1 of the Z-axis direction so as to cover the back face of the light guide plate 80, a second frame 30, which is a resin frame made of resin and holding the edge portions of the liquid crystal panel 10 at a level higher than the level of the first frame 40 while surrounding and holding the lighting unit 8, and a third frame 50, which is an upper metal frame made of metal and placed on the upper side of the second frame 30, i.e., the side Z2 in the Z-axis direction.

The second frame 30 holds the edge portions of the liquid crystal panel 10 and is a rectangular frame that surrounds the periphery of the liquid crystal panel 10. In Embodiment 1, the second frame 30 is made up of four frame plates 31, 32, 33, and 34 divided so as to correspond to the four sides 10a, 10b, 10c, and 10d of the liquid crystal panel 10, respectively. In Embodiment 1, the second frame 30 is black and functions as a light absorption member that prevents stray light from occurring in the lighting unit 8. The frame plates 31, 32, 33, and 34 include side plate portions 311, 321, 331, and 341, which extend downward on the outer sides of the frame plates 31, 32, 33, and 34, upper plate portions 315, 325, 335, and 345, which are edge plate portions that bend inward from the upper end edges of the side plate portions 311, 321, 331, and 341, and projecting plate portions 312, 322, 332, and 342, each of which projects inward from a position between the top and bottom levels of corresponding one of the upper plate portions 315, 325, 335, and 345, respectively. Thus, the projecting plate portions 312, 322, 332, and 342 form stepped portions 313, 323, 333, and 343 inside the frame plates 31, 32, 33, and 34, and the liquid crystal panel 10 is held by the stepped portions 313, 323, 333, and 343 and the projecting plate portions 312, 322, 332, and 342. Furthermore, the light guide plate 80 and the luminous elements 89 etc. of the lighting unit 8 are placed under the projecting plate portions 312 and 322.

The first frame 40 is formed by performing press work or the like on a thin metal plate, such as a stainless steel plate. The first frame 40 includes a bottom plate portion 45 and three side plate portions 42, 43, and 44 standing on the three sides of the outer periphery of the bottom plate portion 45, which exclude the side Y1 in the Y-axis direction, and is shaped like a box that has rectangular faces and is open toward the upper side. The side plate portions 321, 331, and 341 of the second frame 30 meet the outer faces of the side plate portions 42, 43, and 44 of the first frame 40. The side plate portion 311 of the second frame 30 covers the first frame 40 on the side Y1 in the Y-axis direction.

Similar to the first frame 40, the third frame 50 is also formed by performing press work or the like on a thin metal plate, such as a stainless steel plate. The third frame 50 includes a rectangular upper plate portion 55 as an edge plate portion, and four side plate portions 51, 52, 53, and 54 that bend downward from the outer periphery of the upper plate portion 55, and is shaped like a box that has rectangular faces and is open toward the lower side. The side plate portions 51, 52, 53, and 54 meet the outer faces of the side plate portions 311, 321, 331, and 341. The upper plate portion 55 is provided with a rectangular window 550 through which the light emitted from the liquid crystal panel 10 passes, and surrounds and covers the outer edge portions positioned on the display light emitting side of the liquid crystal panel 10.

The third frame 50, the second frame 30, and the first frame 40 formed as described above are coupled by screws (not illustrated) or the like and hold the liquid crystal panel 10 and the lighting unit 8 inside. As illustrated in FIGS. 4A and 4B, flexible sheets 391 and 392 are attached to the lower and upper faces of the projecting plate portions 312, 322, 332, and 342 of the second frame 30. Thus, when the liquid crystal display 100 is assembled, the liquid crystal panel 10 is supported by the projecting plate portions 312, 322, 332, and 342 via the flexible sheet 392. Also, when the liquid crystal display 100 is assembled, the lighting unit 8 is supported via the flexible sheet 391. Furthermore, when the liquid crystal display 100 is assembled, the flexible sheet 391 prevents optical sheets of the lighting unit 8, such as a diffusion sheet 182 and prism sheets 183 and 184, from rising or getting out of position.

The Structure of the Liquid Crystal Panel 10

As illustrated in FIGS. 2A, 2B, 3, 4A, and 4B, the liquid crystal panel 10 has a planar rectangular shape and includes an element substrate 11, which is provided with a pixel electrode (not illustrated) or the like, and an opposite substrate 12, which is placed so as to be opposite the element substrate 11 via a predetermined gap, and a seal material 14 for attaching the opposite substrate 12 and the element substrate 11 to each other, which is shaped like a rectangular frame. In the liquid crystal panel 10, a liquid crystal layer 13 is held in a region surrounded by the seal material 14. The element substrate 11 and the opposite substrate 12 are translucent substrates, such as glass substrates. In the element substrate 11, a plurality of scan lines (not illustrated) extend in the X-axis direction and a plurality of data lines (not illustrated) extend in the Y-axis direction, and a switching element (not illustrated) and a pixel electrode are arranged at positions corresponding to positions where the scan lines and the data lines cross each other.

In Embodiment 1, the opposite substrate 12 is placed on the emitting side of the display light and the element substrate 11 is placed on the side of the lighting unit 8. On the face of the opposite substrate 12 that is opposite the element substrate 11, a frame layer 120 is formed inside the inner edges of the four sides of the seal material 14, and the frame layer 120 is a light blocking layer shaped like a rectangular frame. The region defined by the inner edges of the frame layer 120 is an image display region 100a. Each of the inner edges of the upper plate portion 55 of the third frame 50 is located over a halfway position in a region corresponding to the width of the frame layer 120. The window 550 of the third frame 50 overlaps the inner peripheral portions of the image display region 100a and the frame layer 120.

The liquid crystal panel 10 is a liquid crystal panel in the twisted nematic (TN) mode, the electrically controlled birefringence (ECB) mode, or the vertical aligned nematic (VAN) mode. The element substrate 11 is provided with a pixel electrode, and the opposite substrate 12 is provided with a common electrode (not illustrated). When the liquid crystal panel 10 is a liquid crystal panel in the in-plane switching (IPS) mode or the fringe field switching (FFS) mode, the common electrode is provided on the side of the element substrate 11. The element substrate 11 may be placed closer to the emitting side of the display light than the opposite substrate 12. An upper polarization plate 18 is placed so as to be stacked on the upper face of the liquid crystal panel 10, and a lower polarization plate 17 is placed between the lower face of the liquid crystal panel 10 and the lighting unit 8.

In Embodiment 1, the element substrate 11 is larger than the opposite substrate 12. Therefore, the element substrate 11 includes a protruding portion 110 that protrudes from the end portion of the opposite substrate 12 on the side Y1 in the Y-axis direction, and a plurality of flexible wiring substrates 200 are connected to the upper face of the protruding portion 110. The flexible wiring substrates 200 are connected to a circuit substrate 250, which is a rigid substrate. The circuit substrate 250 is provided with a control IC (not illustrated), which constitutes the image signal supply portion 270 described with reference to FIGS. 1A and 18, and a light source driver IC (not illustrated), which constitutes the light source drive portion 280.

The Structure of the Lighting Unit 8

Figure 5A:
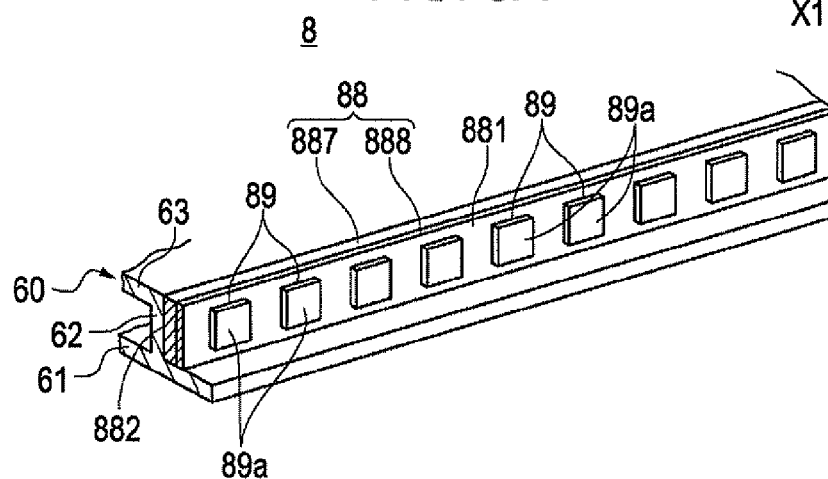
FIGS. 5A and 5B are explanatory views that illustrate the peripheral structure of a light source substrate used for a lighting unit of the liquid crystal display according to Embodiment 1 of the invention.
Figure 5B:
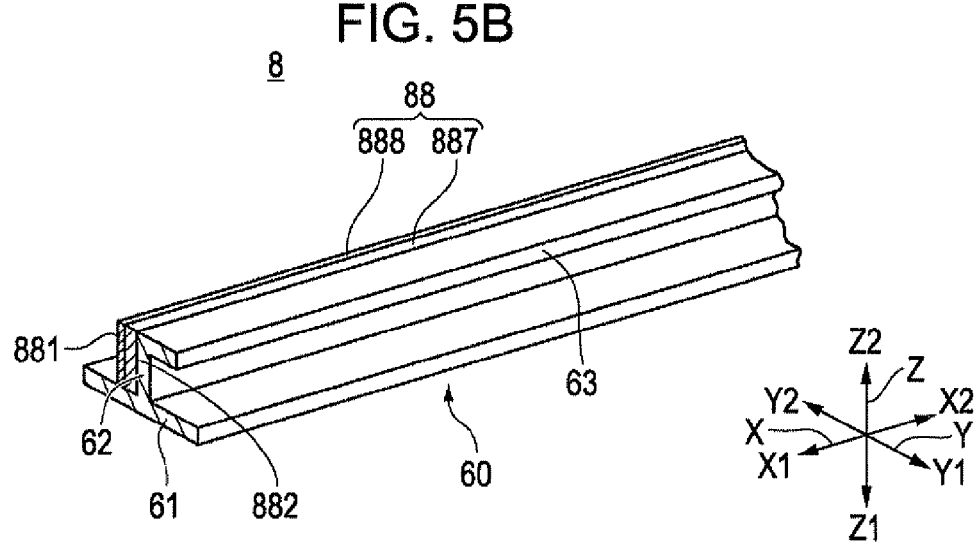

FIGS. 5A and 5B are explanatory views that illustrate the peripheral structure of the light source substrate 88 used for the lighting unit 8 of the liquid crystal display 100 according to Embodiment 1 of the invention. Specifically, FIG. 5A is an explanatory view that schematically illustrates the periphery of the light source substrate 88 on the side of a face 881, and FIG. 5B is an explanatory view that schematically illustrates the periphery of the light source substrate 88 on the side of a face 882. The luminous elements 89 and the light source substrate 88 that are provided on the side face 801, which is the light incident portion 80a, and the luminous elements 89 and the light source substrate 88 that are provided on the side face 802, which is also the light incident portion 80a and is opposite the side face 801 in the Y-axis direction of the light guide plate 80, have the same structures. Therefore, FIG. 5A depicts the luminous elements 89 and the light source substrate 88 arranged on the side face 802 of the light guide plate 80, and FIG. 5B depicts the light source substrate 88 etc. arranged on the side face 801.

As illustrated in FIGS. 3, 4A, and 4B, the lighting unit 8 includes the light guide plate 80, which is placed so as to be stacked on the lower face side of the liquid crystal panel 10, and the luminous elements 89, which are aligned from one end side of corresponding one of the light incident portions 80a, i.e., the side X1 in the X-axis direction toward the other end side of the light incident portion 80a, i.e., the side X2 in the X-axis direction while directing luminous faces 89a toward the light incident portion 80a of the light guide plate 80. In Embodiment 1, the luminous elements 89 are mounted on the face 881 of the light source substrate 88, which extends in the X-axis direction along the light incident portion 80a. Each of the luminous elements 89 is a light emitting diode (LED), which emits white light, and emits light source light as emission light.

Among the side faces 801, 802, 803, and 804 of the light guide plate 80 in the lighting unit 8 according to Embodiment 1, the two side faces 801 and 802 opposite each other in the Y-axis direction are used as the light incident portions 80a. Therefore, the luminous elements 89 direct the luminous faces 89a toward the two light incident portions 80a, i.e., the side faces 801 and 802 of the light guide plate 80, and are aligned from one end side toward the other end side of each of the two light incident portions 80a, i.e., the side faces 801 and 802. In addition, the two light source substrates 88 extend along the two light incident portions 80a, i.e., the side faces 801 and 802, and the luminous elements 89 are mounted on the face 881 of each of the two light source substrates 88.

In Embodiment 1, the light guide plate 80 is a translucent resin plate made of acryl resin, polymethylstyrene resin, polycarbonate resin, or the like. A reflection sheet 187, which is an optical sheet, is placed so as to be stacked between a lower face 80c of the light guide plate 80, which is a face opposite a light emitting face 80b, and the bottom plate portion 45 of the first frame 40.

Furthermore, other optical sheets, such as the diffusion sheet 182, and the prism sheets 183 and 184, are placed so as to be stacked between the upper face of the light guide plate 80, which is referred to as the light emitting face 80b, and the liquid crystal panel 10. The diffusion sheet 182 is a sheet that includes a coated layer obtained by dispersing silica particles or the like onto a translucent resin, such as an acrylic resin or a polycarbonate resin. In Embodiment 1, the two prism sheets 183 and 184 are placed so that the ridge lines of the prism sheets 183 and 184 are perpendicular to each other. Accordingly, the illumination light emitted from the light emitting face 80b of the light guide plate 80 has directivity, which allows the illumination light to obtain its peak in the direction toward the front of the liquid crystal panel 10 via the two prism sheets 183 and 184 after diffusing in all directions via the diffusion sheet 182.

The lower face 80c of the light guide plate 80 under which the reflection sheet 187 is positioned is provided with a plurality of grooves 86 as a diffusion pattern, which are linear minute depressed portions. The grooves 86 reflect and diffuse the light traveling in the light guide plate 80. In Embodiment 1, a plurality of groove lines 860, each of which is constituted by the grooves 86 aligned in the X-axis direction, are arranged in the Y-axis direction so as to be parallel to each other. The density of the grooves 86 is higher as the distance from the luminous elements 89 is greater. Thus, the intensity distribution of the illumination light emitted from the light guide plate 80 is made uniform regardless of the distance from the luminous elements 89. The X-axis direction corresponds to a first direction and the Y-axis direction corresponds to a second direction.

The bottom plate portion 45 of the first frame 40 is provided with a step, which is partially formed in a region that overlaps the side on which the side face 801 of the light guide plate 80 is positioned so that a gap is secured between the lower face 80c of the light guide plate 80 and the first frame 40. The bottom plate portion 45 bends toward the light guide plate 80. Accordingly, the reflection sheet 187 and a lower plate portion 61 of a light source support member 60 may be sandwiched between the lower face 80c of the light guide plate 80 and the bottom plate portion 45. In addition, since part of the bottom plate portion 45 of the first frame 40 bends toward the light guide plate 80 and a depressed portion is formed on the back face side of the first frame 40, the flexible wiring substrate 200 bends and extends to the lower face or the back face of the bottom plate portion 45 of the first frame 40 and the circuit substrate 250 is placed so as to be accommodated within the depth of the depressed portion. Thus, the lighting unit 8 may be made thin.

In Embodiment 1, the light source substrate 88 is placed so that the face 881 on which the luminous elements 89 are mounted faces the light incident portion 80a of the light guide plate 80. Also, the light source substrate 88 has a structure in which a wiring pattern and a land are provided together with an insulation layer on the side of the face 881 of a planar metal plate 887, which is a support plate extending along the light incident portion 80a. This structure may be obtained by attaching a flexible wiring substrate 888 to the face 881 of the metal plate 887 and in the flexible wiring substrate 888, a resin base material layer, a wiring pattern, and an insulation protection layer, etc. are arranged in this order. Accordingly, the wiring pattern and the land on which a chip of the luminous element 89 is mounted are electrically insulated from the metal plate 887. In Embodiment 1, the metal plate 887 is an aluminum plate, which secures the mechanical strength of the light source substrate 88 and also functions as a plate that releases the heat caused by the luminous elements 89.

As illustrated in FIGS. 3, 4A, 4B, 5A, and 5B, the light source support member 60 that holds the light source substrate 88 is placed on the side of the face 882 of each of the two light source substrates 88, and the light source support member 60 is placed and held between the first frame 40 and the second frame 30. In Embodiment 1, the light source support member 60 is a bar-like metal component that extends along the face 882 of the light source substrate 88. The light source support member 60 includes the lower plate portion 61, which is placed on the bottom plate portion 45 of the first frame 40, and a substrate support plate portion 62, which constitutes a wall face that projects upward from a halfway position of a region corresponding to the width of the lower plate portion 61. The light source support member 60 further includes an upper plate portion 63 positioned on the side of the top end of the substrate support plate portion 62, which is the side opposite the side on which the lower plate portion 61 is positioned. The upper plate portion 63 bends from the substrate support plate portion 62 toward the side opposite the side on which the light guide plate 80 is positioned. The upper plate portion 63 is fixed to the upper plate portion 55 of the third frame 50 and at least one of the upper plate portions 315 and 325 of the second frame 30 by screws or the like.

In the light source support member 60 structured as described above, the face of the substrate support plate portion 62 that is present on the side on which the light guide plate 80 is positioned is referred to as a substrate holding face 620 for holding the light source substrate 88, and the light source substrate 88 is fixed to the substrate holding face 620 by a screw or the like. Thus, the face 882 of the metal plate 887 of the light source substrate 88 is wholly contacted on the substrate holding face 620, and the light source substrate 88 abuts the substrate holding face 620 in a cohesive state. The light source support member 60 is made of metal, such as aluminum or an iron-based material. Therefore, the heat caused by the luminous elements 89 is transmitted from the metal plate 887 of the light source substrate 88 to the light source support member 60, and the heat of the light source support member 60 is transmitted to the first frame 40. Accordingly, the increase in the temperature of the luminous element 89 may be suppressed.

The Shapes of the Light Guide Plate 80 Etc.

Figure 6:
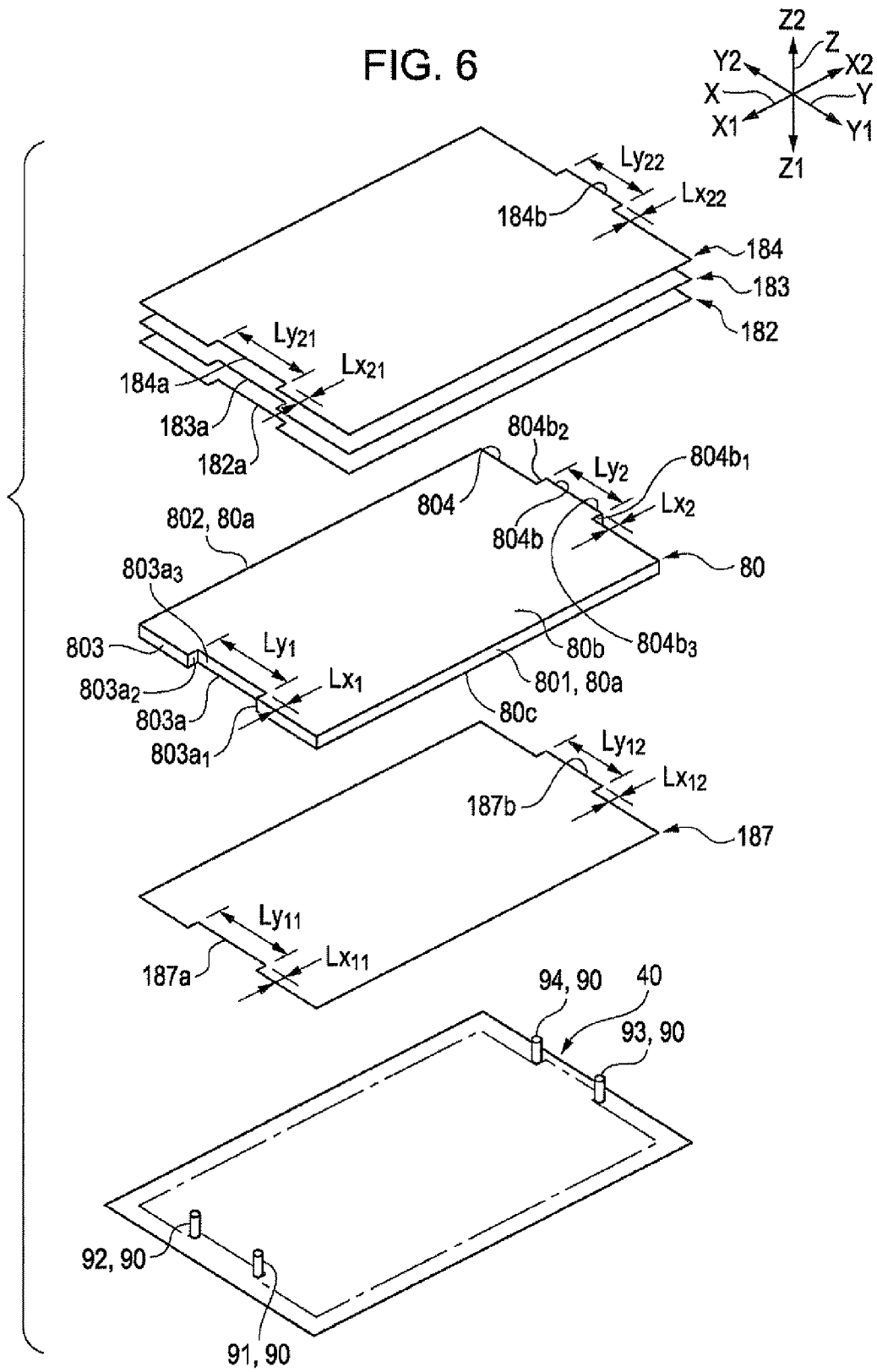
FIG. 6 is an exploded perspective view of the lighting unit of the liquid crystal display according to Embodiment 1 of the invention.
Figure 7:
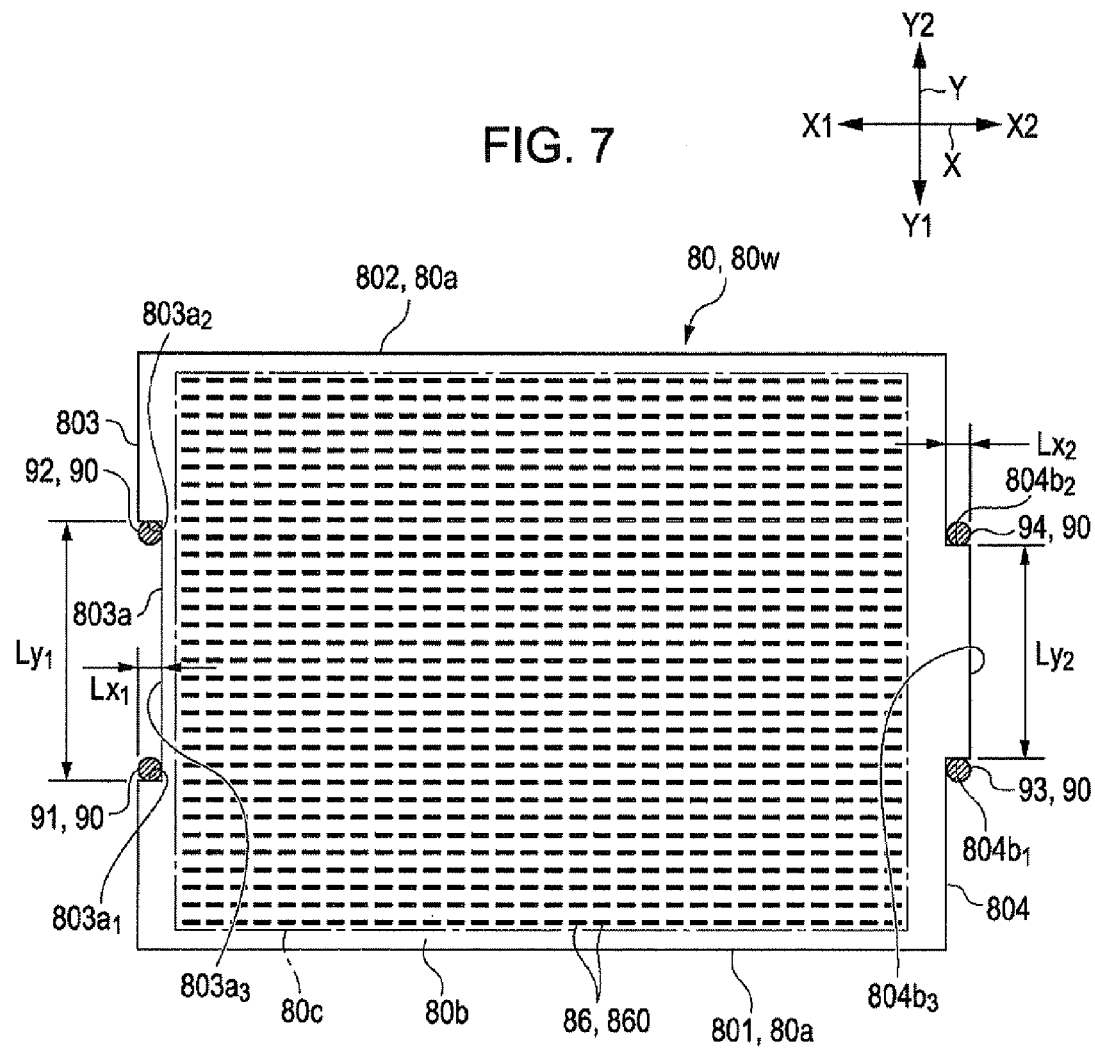
FIG. 7 is an explanatory view that illustrates the positioning structure for the light guide plate etc. in the liquid crystal display according to Embodiment 1 of the invention.

FIG. 6 is an exploded perspective view of the lighting unit 8 of the liquid crystal display 100 according to Embodiment 1 of the invention. FIG. 7 is an explanatory view that illustrates the positioning structure for the light guide plate 80 etc. in the liquid crystal display 100 according to Embodiment 1 of the invention. In FIG. 7, the grooves 86 formed on the lower face 80c of the light guide plate 80 as a diffusion pattern are represented by solid lines. Regarding the first frame 40, only the bottom plate portion 45 is depicted and the illustration of the side plate portions 42, 43, and 44 is omitted in FIG. 6.

As illustrated in FIGS. 6 and 7, in the lighting unit 8 of the liquid crystal display 100 according to Embodiment 1, the side faces 801 and 802 of the light guide plate 80, which are positioned on the sides Y1 and Y2 in the Y-axis direction, respectively, extend linearly in the X-axis direction. On the other hand, the side face 803 positioned on the side X1 in the X-axis direction is partially depressed relative to the outline side, and the side face 804 positioned on the side X2 in the X-axis direction partially projects relative to the outline side. More specifically, the light guide plate 80 is provided with a depressed portion 803a, which is depressed from the side face 803 positioned on the side X1 in the X-axis direction toward the side X2 in the X-axis direction, and a projecting portion 804b, which is positioned on the side X2 in the X-axis direction so as to be opposite the depressed portion 803a and projects from the side face 804 positioned on the side X2 in the X-axis direction toward the side X2 in the X-axis direction.

A length $Ly_2$ of the projecting portion 804b, which is obtained in the Y-axis direction, and a length $Ly_1$ of the depressed portion 803a, which is obtained in the Y-axis direction, are related so as to satisfy the following expression:

$$\text{The length } Ly_2 \leq \text{The length } Ly_1$$

and the length $Ly_2$ of the projecting portion 804b, which is obtained in the Y-axis direction, is equal to or smaller than the length $Ly_1$ of the depressed portion 803a, which is obtained in the Y-axis direction.

A length $Lx_2$ of the projecting portion 804b, which is obtained in the X-axis direction, and a length $Lx_1$ of the depressed portion 803a, which is obtained in the X-axis direction, are related so as to satisfy the following expression:

$$\text{The length } Lx_2 \leq \text{The length } Lx_1$$

and the length $Lx_2$ of the projecting portion 804b, which is obtained in the X-axis direction, is equal to or smaller than the length $Lx_1$ of the depressed portion 803a, which is obtained in the X-axis direction. In Embodiment 1, the length $Lx_2$ of the projecting portion 804b, which is obtained in the X-axis direction, is equal to the length $Lx_1$ of the depressed portion 803a, which is obtained in the X-axis direction.

As illustrated in FIG. 6, the reflection sheet 187 is provided with a depressed portion 187a, which is a sheet-side depressed portion, and a projecting portion 187b, which is a sheet-side projecting portion. The depressed portion 187a and the projecting portion 187b are formed in the positions corresponding to the depressed portion 803a and the projecting portion 804b of the light guide plate 80. More specifically, the reflection sheet 187 is provided with the depressed portion 187a, which is depressed toward the side X2 in the X-axis direction, and the projecting portion 187b, which is positioned on the side X2 in the X-axis direction so as to be opposite the depressed portion 187a and projects toward the side X2 in the X-axis direction. Furthermore, the depressed portion 187a is equal to the depressed portion 803a in size, and the projecting portion 187b is equal to the projecting portion 804b in size. Therefore, a length $Ly_{12}$ of the projecting portion 187b, which is obtained in the Y-axis direction, and a length $Ly_{11}$ of the depressed portion 187a, which is obtained in the Y-axis direction, are related so as to satisfy the following expression:

The length $Ly_{12}$≦The length $Ly_{11}$ and the length $Ly_{12}$ of the projecting portion 187b, which is obtained in the Y-axis direction, is equal to or smaller than the length $Ly_{11}$ of the depressed portion 187a, which is obtained in the Y-axis direction. A length $Lx_{12}$ of the projecting portion 187b, which is obtained in the X-axis direction, and a length $Lx_{11}$ of the depressed portion 187a, which is obtained in the X-axis direction, are related so as to satisfy the following expression:

The length $Lx_{12}$≦The length $Lx_{11}$ and the length $Lx_{12}$ of the projecting portion 187b, which is obtained in the X-axis direction, is equal to or smaller than the length $Lx_{11}$ of the depressed portion 187a, which is obtained in the X-axis direction. In Embodiment 1, the length $Lx_{12}$ of the projecting portion 187b, which is obtained in the X-axis direction, is equal to the length $Lx_{11}$ of the depressed portion 187a, which is obtained in the X-axis direction.

Similar to the reflection sheet 187, the prism sheet 184 is also provided with a depressed portion 184a, which is a sheet-side depressed portion, and a projecting portion 184b, which is a sheet-side projecting portion. The depressed portion 184a and the projecting portion 184b are formed in the positions corresponding to the depressed portion 803a and the projecting portion 804b of the light guide plate 80. More specifically, the prism sheet 184 is provided with the depressed portion 184a, which is depressed toward the side X2 in the X-axis direction, and the projecting portion 184b, which is positioned on the side X2 in the X-axis direction so as to be opposite the depressed portion 184a and projects toward the side X2 in the X-axis direction. Furthermore, the depressed portion 184a is equal to the depressed portion 803a in size, and the projecting portion 184b is equal to the projecting portion 804b in size. Therefore, a length $Ly_{22}$ of the projecting portion 184b, which is obtained in the Y-axis direction, and a length $L_{y21}$ of the depressed portion 184a, which is obtained in the Y-axis direction, are related so as to satisfy the following expression:

The length $Ly_{22}$≦The length $Ly_{21}$ and the length $Ly_{22}$ of the projecting portion 184b, which is obtained in the Y-axis direction, is equal to or smaller than the length $Ly_{21}$ of the depressed portion 184a, which is obtained in the Y-axis direction. Furthermore, a length $Lx_{22}$ of the projecting portion 184b, which is obtained in the X-axis direction, and a length $Lx_{21}$ of the depressed portion 184a, which is obtained in the X-axis direction, are related so as to satisfy the following expression:

The length $Lx_{22}$≦The length $Lx_{12}$ and the length $Lx_{22}$ of the projecting portion 184b, which is obtained in the X-axis direction, is equal to or smaller than the length $Lx_{21}$ of the depressed portion 184a, which is obtained in the X-axis direction. In Embodiment 1, the length $Lx_{22}$ of the projecting portion 184b, which is obtained in the X-axis direction, is equal to the length $Lx_{21}$ of the depressed portion 184a, which is obtained in the X-axis direction.

Similar to the reflection sheet 187 and the prism sheet 184, each of the other optical sheets, i.e., the diffusion sheet 182 and the prism sheet 183, also has a planar shape. Regarding the diffusion sheet 182 and the prism sheet 183, only depressed portions 182a and 183a, which are sheet-side depressed portions, are depicted in FIG. 6 and the explanation on the shapes is omitted.

The Positioning Structure of the Light Guide Plate 80 Etc.

As illustrated in FIGS. 4A, 4B, 6, and 7, the first frame 40 of the frame body 9 is provided with positioning projections 90 that are placed in the vicinity of the region positioned under the light guide plate 80, which is the region surrounded by the dot-dash lines in FIG. 6, so as to set the position of the light guide plate 80. As illustrated in FIG. 4B, in Embodiment 1, each of the positioning projections 90 is constituted by a resin portion 95 formed integrally with the first frame 40 and projects from the bottom face portion of the first frame 40 in the thickness direction of the light guide plate 80.

As illustrated in FIGS. 6 and 7, the positioning projections 90 are constituted by a first positioning projection 91, a second positioning projection 92, a third positioning projection 93, and a fourth positioning projection 94. The first positioning projection 91 abuts a first inside face $803a_1$ and a bottom portion $803a_3$ that correspond to one of the corner portions of the depressed portion 803a, which is positioned on the side Y1 in the Y-axis direction. The second positioning projection 92 abuts a second inside face $803a_2$ and the bottom portion $803a_3$ that correspond to the other corner portion of the depressed portion 803a, which is positioned on the side Y2 in the Y-axis direction. The third positioning projection 93 abuts the side face 804, which constitutes the outline side along the Y-axis direction, and a first outside face $804b_1$, which projects from the side face 804 outward toward the side X2 in the X-axis direction, so as to correspond to one of the corner portions of the projecting portion 804b, which is positioned on the side Y1 in the Y-axis direction. The fourth positioning projection 94 abuts the side face 804, which constitutes the outline side along the Y-axis direction, and a second outside face $804b_2$, which projects from the side face 804 outward toward the side X2 in the x-axis direction, so as to correspond to the other corner portion of the projecting portion 804b, which is positioned on the side Y2 in the Y-axis direction. Thus, the position of the light guide plate 80 is set by the four positioning projections 90. Similar to the light guide plate 80, the optical sheets including the reflection sheet 187, the diffusion sheet 182, and the prism sheets 183 and 184 are also provided with sheet-side depressed portions and sheet-side projecting portions similar to the depressed portion 803a and the projecting portion 804b, and the positions of the optical sheets are set by using the four positioning projections 90.

In Embodiment 1, the four positioning projections 90, i.e., the positioning projections 91 to 94 are cylinder-like projections that have the same outside diameter, and the lengths of the positioning projections 91 to 94 that are obtained in the Y-axis direction are the same. Therefore, the first positioning projection 91 and the third positioning projection 93 are of equal size in the Y-axis direction and are formed at the same position in the Y-axis direction so as to be placed apart in the X-axis direction and opposite each other. Furthermore, the second positioning projection 92 and the fourth positioning projection 94 are of equal size in the Y-axis direction and are formed at the same position in the Y-axis direction so as to be placed apart in the X-axis direction and opposite each other.

The outside diameter of each of the positioning projections 90, which is the length obtained in the Y-axis direction, is equivalent to a half of the difference between the length $Ly_2$ of the projecting portion 804b, which is obtained in the Y-axis direction, and the length $Ly_1$ of the depressed portion 803a, which is obtained in the Y-axis direction. Therefore, the positioning projections 90 may be placed in the positions corresponding to remaining material portions 80u described with reference to FIG. 8.

Since the outside diameter of each of the positioning projections 90, which is the length obtained in the Y-axis direction, is equal to the length $Lx_2$ of the projecting portion 804b, which is obtained in the X-axis direction, and the length $Lx_1$ of the depressed portion 803a, which is obtained in the X-axis direction, or is slightly smaller than the length $Lx_2$ and the length $Lx_1$, the positioning projection 90 protrudes neither from a top end portion 804b₃ of the projecting portion 804b nor from the inside of the depressed portion 803a.

The Manufacturing Method of the Light Guide Plate 80

Figure 8:
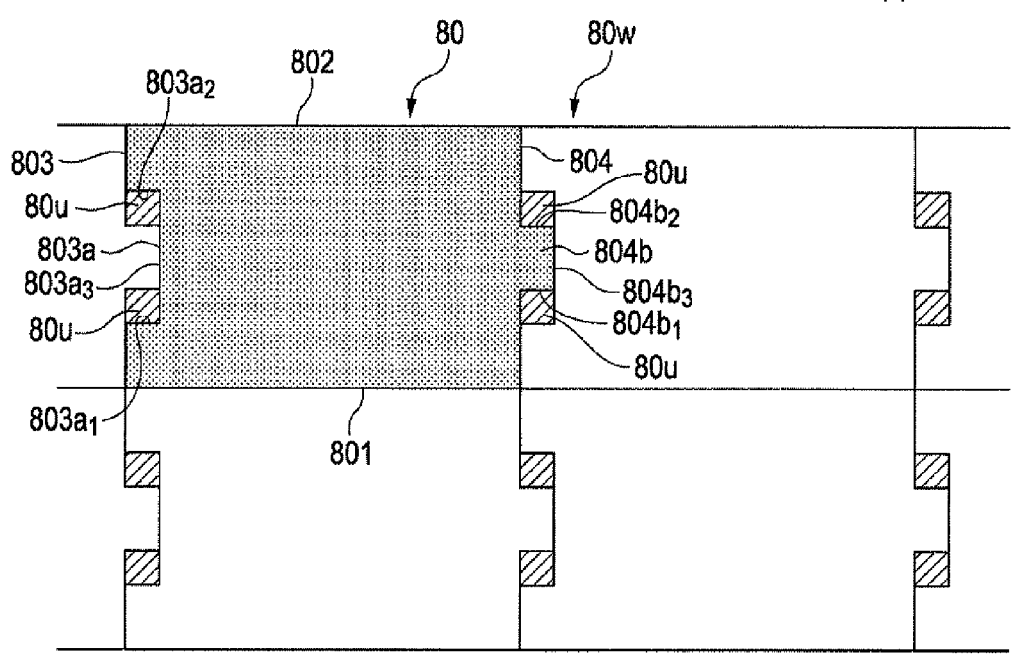
FIG. 8 is an explanatory view that illustrates a manufacturing method of the light guide plate depicted in FIG. 7.

FIG. 8 is an explanatory view that illustrates a manufacturing method of the light guide plate 80 depicted in FIG. 7. In FIG. 8, one of the regions in which the light guide plates 80 are cut out is shown by a dotted pattern and the remaining material portions 80u are depicted using oblique lines that rise from left to right.

When manufacturing the light guide plate 80 described with reference to FIG. 7 etc., as illustrated in FIG. 8, after forming a large resin plate 80w for the light guide plates 80 by extrusion or the like, the light guide plates 80 are cut out of the resin plate 80w, which is a base material. More specifically, after placing the resin plate 80w on an X-Y stage (not illustrated), the resin plate 80w is irradiated with laser beams of a carbon dioxide laser and a femtosecond laser while dissolving and volatilizing the macromolecular material of the resin plate 80w in the irradiated position so that the light guide plates 80 are cut out. After that, the overall cut faces of the light guide plates 80 or the side faces 801 and 802 used as the light incident portions 80a undergo a finishing process, such as polishing.

When the light guide plates 80 are manufactured in the above-described manner, the depressed portion 803a and the projecting portion 804b are formed at positions opposite each other in the X-axis direction, and the projecting portion 804b and the depressed portion 803a are formed in such sizes as to satisfy the following expressions:

The length $Ly_2$ of the projecting portion 804b≦The length $Ly_1$ of the depressed portion 803a The length $Lx_2$ of the projecting portion 804b≦The length $Lx_1$ of the depressed portion 803a.

Therefore, when the light guide plates 80 are cut out of the large resin plate 80w, between one region and another region that are adjacent to each other in the X-axis direction, the region in which the projecting portion 804b is cut out is positioned inside the region in which the depressed portion 803a is cut out. Thus, the remaining material portions 80u, which remain after cutting the light guide plates 80 out of the large resin plate 80w, are small.

When the following expressions:

The length $Ly_2$ of the projecting portion 804b<The length $Ly_1$ of the depressed portion 803a The length $Lx_2$ of the projecting portion 804b<The length $Lx_1$ of the depressed portion 803a are satisfied in the relation between the depressed portion 803a and the projecting portion 804b, and the differences between the higher values and the lower values are equivalent to or exceed the size of the positioning projection 90, in the lighting unit 8, the positioning projections 90 are placed in the regions corresponding to the remaining material portions 80u, each of which is between the depressed portion 803a of the given light guide plate 80 and the projecting portion 804b of the other light guide plate 80 adjacent to the given light guide plate 80 in the X-axis direction.

When the following expressions:

The length $Ly_2$ of the projecting portion 804b=The length $Ly_1$ of the depressed portion 803a The length $Lx_2$ of the projecting portion 804b=The length $Lx_1$ of the depressed portion 803a are satisfied in the relation between the depressed portion 803a and the projecting portion 804b, or the differences between the higher values and the lower values are less than the size of the positioning projection 90, in the lighting unit 8, the positioning projections 90 are placed outside the projecting portion 804b and inside the depressed portion 803a. Therefore, although the second positioning projection 92 and the fourth positioning projection 94, and the positioning projection 91 and the positioning projection 93 of equal size in the Y-axis direction, the second positioning projection 92 and the fourth positioning projection 94, and the positioning projection 91 and the positioning projection 93 are formed in different positions in the Y-axis direction.

Since the optical sheets including the reflection sheet 187, the diffusion sheet 182, and the prism sheets 183 and 184 are also provided with sheet-side depressed portions and sheet-side projecting portions similar to the depressed portion 803a and the projecting portion 804b, similar to the light guide plate 80, the optical sheets may also be cut out of a material in the form of a large sheet efficiently.

Major Advantages of Embodiment 1

As described above, in the liquid crystal display 100 and the lighting unit 8 according to Embodiment 1, the side face 803 of the light guide plate 80, which is positioned on the side X1 in the X-axis direction, is provided with the depressed portion 803a, and the side face 804 of the light guide plate 80, which is positioned on the side X2 in the X-axis direction, is provided with the projecting portion 804b. Therefore, the light guide plate 80 may be placed in a predetermined position of the frame body 9 using the depressed portion 803a and the projecting portion 804b.

The depressed portion 803a and the projecting portion 804b are formed at positions opposite each other in the X-axis direction and the projecting portion 804b is equal to or smaller than the depressed portion 803a in size. Therefore, when the light guide plates 80 are cut out of the large resin plate 80w, between one region and another region that are adjacent to each other in the X-axis direction, the region in which the projecting portion 804b is cut out is positioned inside the region in which the depressed portion 803a is cut out. Thus, the remaining material portions 80u, which remain after cutting the light guide plates 80 out of the large resin plate 80w, are small and material wastage is reduced. In addition, since the length $Lx_2$ of the projecting portion 804b and the length $Lx_1$ of the depressed portion 803a are equal to each other, the top end portion 804b₃ of the projecting portion 804b and the bottom portion 803a₃ of the depressed portion 803a coincide with each other. Therefore, the top end portion 804b₃ of the projecting portion 804b and the bottom portion 803a₃ of the depressed portion 803a may be cut at the same time.

Embodiment 2

In Embodiment 1 described above, the face 881 of the light source substrate 88 faces the light incident portion 80a of the light guide plate 80. However, the aspect of the invention may be applied to the liquid crystal display 100 in which the face 881 of the light source substrate 88 is orthogonal to the light incident portion 80a of the light guide plate 80.

Another Embodiment

In the above-described embodiments, the resin portion 95 is formed integrally with the first frame 40 when forming the positioning projection 90. However, the positioning projection 90 may be formed by causing part of the first frame 40 to project. Furthermore, the positioning projection 90 may be constituted by a metal pin attached to the bottom face portion of the first frame 40.

Usage Examples in Other Electronic Apparatuses

In the above-described embodiments, a liquid crystal television is taken as an example of the electronic apparatus 2000 provided with the liquid crystal display 100. However, the liquid crystal display 100 may also be used for a display portion of an electronic apparatus other than the liquid crystal television, such as a personal computer, a digital signage device, a car navigation device, or a mobile information terminal device, to which the aspect of the invention is applied.

The entire disclosure of Japanese Patent Application No. 2011-161710, filed Jul. 25, 2011 is expressly incorporated by reference herein.

What is claimed is:

1. A lighting unit comprising:
   a light guide plate;
   a light source that is provided on a side of an end serving as a light incident face; and
   a frame body that holds the light guide plate and the light source, wherein
   the light guide plate includes:
      a depressed portion that is depressed from a first side of the light guide plate in a first direction; and
      a projecting portion that projects from a second side of the light guide plate in the first direction, the second side being opposite the first side, and that is formed at a position on the second side so as to be opposite the depressed portion, wherein
   a length of the projecting portion in a second direction that crosses the first direction, the first direction and the second direction being in-plane directions, is equal to or smaller than a length of the depressed portion in the second direction, and
   a length of the projecting portion in the first direction is equal to or smaller than a length of the depressed portion in the first direction.

2. The lighting unit according to claim 1, wherein the length of the projecting portion of the light guide plate in the first direction and the length of the depressed portion of the light guide plate in the first direction are equal to each other.

3. The lighting unit according to claim 1, wherein the frame body includes:
   a first positioning projection that abuts a first inside face of the depressed portion of the light guide plate, the first inside face being positioned on one side in the second direction;
   a second positioning projection that abuts a second inside face of the depressed portion of the light guide plate, the second inside face being positioned on another side in the second direction;
   a third positioning projection that abuts a first outside face of the projecting portion of the light guide plate, the first outside face being positioned on the one side in the second direction; and
   a fourth positioning projection that abuts a second outside face of the projecting portion of the light guide plate, the second outside face being positioned on the other side in the second direction.

4. The lighting unit according to claim 3, wherein
   the first positioning projection and the third positioning projection are of equal size in the second direction and are formed at the same position in the second direction so as to be opposite each other in the first direction, and
   the second positioning projection and the fourth positioning projection are of equal size in the second direction and are formed at the same position in the second direction so as to be opposite each other in the first direction.

5. The lighting unit according to claim 1, further comprising an optical sheet placed so as to be stacked over the light guide plate, wherein
   the optical sheet includes:
      a sheet-side depressed portion that is depressed from a first side of the optical sheet in the first direction; and
      a sheet-side projecting portion that projects from a second side of the optical sheet in the first direction, the second side of the optical sheet being opposite the first side of the optical sheet, and that is formed at a position on the second side of the optical sheet so as to be opposite the sheet-side depressed portion, wherein
   a length of the sheet-side projecting portion in the second direction is equal to or smaller than a length of the sheet-side depressed portion in the second direction, and
   a length of the sheet-side projecting portion in the first direction is equal to or smaller than a length of the sheet-side depressed portion in the first direction.

6. The lighting unit according to claim 5, wherein, when viewed in a third direction that crosses the first direction and the second direction,
   the sheet-side depressed portion of the optical sheet overlaps the depressed portion of the light guide plate, and
   the sheet-side projecting portion of the optical sheet overlaps the projecting portion of the light guide plate.

7. The lighting unit according to claim 1, wherein an end of the light guide plate positioned in the second direction is used as the light incident face.

8. A liquid crystal display comprising the lighting unit according to claim 1, the liquid crystal display including a liquid crystal panel placed so as to be stacked on a light emitting face of the light guide plate.

9. An electronic apparatus comprising the liquid crystal display according to claim 8.

* * * * *